(12) United States Patent
Warner et al.

(10) Patent No.: US 12,314,946 B2
(45) Date of Patent: *May 27, 2025

(54) DYNAMIC SECURITY CODE AUTHORIZATION VERIFICATION SERVICE

(71) Applicant: MasterCard International Incorporated, Purchase, NY (US)

(72) Inventors: Maribeth Sevigny Warner, Clarkston, VA (US); Pete Kaulbach, Bedford (CA); Robert C Dunnell, Saint Louis, MO (US); Robert J McDonald, Belleville, IL (US); Kathy Donnelly, Cottleville, MO (US); Thomas Roewe, Belleville, IL (US); Ghassan T Jabr, Wentzville, MO (US); Michael Hochhalter, Lake St. Louis, MO (US); Russell W Ball, Bridgeton, MO (US); Winifred Elizabeth House, Troy, MO (US); Prasad Krishnamoorthy Rao, Wildwood, MO (US); Matthew Hanmer, Northampton (GB); Nora Kryza, Fenton, MI (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/750,974

(22) Filed: May 23, 2022

(65) Prior Publication Data

US 2022/0277303 A1    Sep. 1, 2022

Related U.S. Application Data

(63) Continuation of application No. 16/995,374, filed on Aug. 17, 2020, now Pat. No. 11,341,494, which is a
(Continued)

(51) Int. Cl.
*G06Q 40/00* (2023.01)
*G06Q 20/34* (2012.01)
(Continued)

(52) U.S. Cl.
CPC ......... *G06Q 20/401* (2013.01); *G06Q 20/341* (2013.01); *G06Q 20/382* (2013.01);
(Continued)

(58) Field of Classification Search
None
See application file for complete search history.

(56) References Cited

U.S. PATENT DOCUMENTS 5,727,163 A    3/1998 Bezos
8,919,643 B2    12/2014 Ashfield
(Continued)

OTHER PUBLICATIONS

IDS which was filed on Jan. 27, 2016 in U.S. Appl. No. 15/007,837.
(Continued)

*Primary Examiner* — Olabode Akintola
(74) *Attorney, Agent, or Firm* — Buckley, Maschoff & Talwalkar LLC

(57) ABSTRACT

A method includes receiving a request to verify a dynamic security code included in a transaction authorization request message. The transaction authorization request message was generated in connection with a payment account transaction. The method further includes performing a verification process with respect to the dynamic security code to generate a verification result. In addition, the transaction authorization request message may be modified by adding the verification result to the transaction authorization request message. Also, the modified transaction authorization request message may be transmitted to an issuer of a payment account designated for use in the payment account transaction.

13 Claims, 5 Drawing Sheets

Related U.S. Application Data continuation of application No. 15/007,837, filed on Jan. 27, 2016, now abandoned.

(60) Provisional application No. 62/265,020, filed on Dec. 9, 2015.

(51) Int. Cl.
  *G06Q 20/38* (2012.01)
  *G06Q 20/40* (2012.01)
  *G06Q 30/0601* (2023.01)

(52) U.S. Cl.
  CPC ........... *G06Q 20/385* (2013.01); *G06Q 20/40* (2013.01); *G06Q 20/4018* (2013.01); *G06Q 20/405* (2013.01); *G06Q 20/409* (2013.01); *G06Q 30/0601* (2013.01)

(56) References Cited

U.S. PATENT DOCUMENTS

| | | | | |
|---|---|---|---|---|
| 9,033,218 | B1* | 5/2015 | Batra | G06K 19/077 235/375 |
| 10,607,212 | B2* | 3/2020 | Sheets | G06Q 20/3829 |
| 11,341,494 | B2* | 5/2022 | Warner | G06Q 20/385 |
| 2008/0054079 | A1 | 3/2008 | Mullen | |
| 2009/0063345 | A1 | 3/2009 | Erikson | |
| 2009/0173782 | A1* | 7/2009 | Muscato | G06Q 20/40975 235/379 |
| 2011/0040640 | A1 | 2/2011 | Erikson | |
| 2012/0084207 | A1 | 4/2012 | Horvath et al. | |
| 2012/0153028 | A1* | 6/2012 | Poznansky | G07F 7/122 235/492 |
| 2014/0279555 | A1 | 9/2014 | Guillaud | |
| 2014/0310176 | A1 | 10/2014 | Saunders et al. | |
| 2015/0161612 | A1 | 6/2015 | Parento et al. | |
| 2015/0371234 | A1* | 12/2015 | Huang | G06Q 20/20 705/44 |

OTHER PUBLICATIONS

IDS which was filed on Mar. 30, 2017 in U.S. Appl. No. 15/007,837.
PCT Notification of Transmittal of the International Search Report and Written Opinion, International Searching I Authority, mailed Mar. 23, 2017 (Mar. 23, 2017), for Application No. PCT/US2016/065045, 12pgs.
892 Form dated Aug. 13, 2018 which was issued in U.S. Appl. No. 15/007,837.
892 Form dated Jan. 30, 2019 which was issued in U.S. Appl. No. 15/007,837.
How Visa' Payment System Works, UniBul's Money Blog, undated, available at http://blog.unibulmerchantservices.com/how-visas-payment-system-works.
892 Form dated Jan. 25, 2022 which was issued in U.S. Appl. No. 16/995,374.
IDS which was filed on Feb. 17, 2021 in U.S. Appl. No. 16/995,374.
Indian Search Report and Written Opinion dated Nov. 26, 2020 which was issued in connection with a counterpart application IN201811025791.
IDS which was filed on Jul. 22, 2021 in U.S. Appl. No. 16/995,374.
Chinese First Office Action dated Jul. 5, 2021 which was issued in a counterpart application CN201680072226.X.
892 Form dated Sep. 17, 2021 which was issued in U.S. Appl. No. 16/995,374.
How do RSA Secure ID Keys Work? (Year: 2015).
Notice of Allowance issued in U.S. Appl. No. 16/995,374.
Second Chinese Office Action dated Mar. 31, 2022 which was issued in connection with CN 20168007226.X, English translation provided, pp. 9.

* cited by examiner

DYNAMIC SECURITY CODE AUTHORIZATION VERIFICATION SERVICE

CROSS REFERENCE TO RELATED APPLICATIONS

This application is a continuation of U.S. patent application Ser. No. 16/995,374, filed on Aug. 17, 2020, which claims the benefit of U.S. patent application Ser. No. 15/007,837, filed on Jan. 27, 2016, which claims the benefit of U.S. Provisional Patent application No. 62/265,020 filed on Dec. 9, 2015, the entire contents of each of which are hereby incorporated by reference for all purposes.

BACKGROUND

Payment accounts are in widespread use for both in-store and online purchase transactions. FIG. 1 is a block diagram of a conventional payment system 100 as it may operate in connection with an online purchase transaction.

The system 100 includes an e-commerce server computer 102 that may be operated by or on behalf of an online merchant to permit online shopping transactions. For this purpose, as is well known, the e-commerce server computer 102 may host a shopping website, sometimes referred to as an "online store". A customer 103 who operates a customer device 104 may access the shopping website by communicating over the Internet 105 with the e-commerce server computer 102. As is very well-known to those who are skilled in the art, the customer device 104 may be, for example, a personal computer or notebook computer that runs a browser program, a tablet computer or smartphone that runs a mobile browser and/or a suitable app, etc. In entering payment information into a page served by the e-commerce server computer 102 to the customer device 104, the customer 103 may refer to a payment card 106 issued to the customer 103 in connection with the payment account to be used for the current online purchase transaction.

In connection with the online purchase transaction, the e-commerce server computer 102 may transmit a transaction authorization request message (sometimes simply referred to as an "authorization request") to the merchant's acquirer financial institution ("acquirer" or "transaction acquirer"), indicated by reference numeral 110. The acquirer 110 may route the authorization request via a payment network 112 to a server computer 114 operated by the issuer of the payment account that corresponds to the payment card 106 and the payment account number provided by the customer as part of the checkout process for the online purchase transaction. Also, the authorization response generated by the issuer server computer 114 may be routed back to the acquirer 110 via the payment network 112. The acquirer 110 may confirm to the merchant (i.e., to the e-commerce server computer 102) that the transaction has been approved.

As is familiar to those who engage in online purchase transactions, during the checkout phase of the transaction the customer may enter payment related information such as the customer's name as it appears on the payment account, the PAN (primary account number) that identifies the payment account, and the current expiration date for the account. In addition, the customer may—in many cases—be prompted to enter a three or four digit security code that typically is printed on the rear face (on the signature slip) of the payment card. Common names for such a code include "CVC" (card verification code) and "CVV" (card verification value). All of these items of information may be included in the authorization request.

Referring again to FIG. 1, the payment network 112 may be, for example, the well-known Banknet® system operated by MasterCard International Incorporated, which is the assignee hereof.

The components of the system 100 as depicted in FIG. 1 are only those that are needed for processing a single transaction. Those who are skilled in the art will recognize that in the real world, online shopping and payment systems may process many purchase transactions (including simultaneous transactions) and may include a considerable number of payment account issuers and their computers, a considerable number of acquirers and their computers, and numerous merchants and their e-commerce servers. The system may also include a very large number of customers/online shoppers, who hold payment accounts that they use for their online shopping activities. It is also well known that elements of the system 100 (e.g., acquirers, the payment network, payment account issuers) may play similar roles in connection with in-store purchase transactions and in other types of transactions.

Resuming the above discussion of the security code printed on the card, it has been proposed, for purposes of deterring and/or preventing fraudulent transactions, to enhance the security code feature. For example, in U.S. Pat. No. 8,919,643 and U.S. Patent publication no. 2012/0153028, it has been proposed that processing capability on the payment card (i.e., where the payment card is embodied as an IC card) be utilized to dynamically vary the security code, and to display the current value of the dynamic security code on a display element included in the payment card. However, verification of dynamic security codes may place a significant burden on the card/account issuer, thereby making it unattractive or uneconomic to incorporate dynamic security codes in an issuer's payment account practices.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a service may be provided to detect authorization requests that contain dynamic security codes. The service also incorporates verification of the dynamic security code included in the authorization request, and adding to the authorization request an indication of the result of the verification process. The authorization request, including the dynamic security code verification result, may then be routed to the account issuer for approval (if appropriate) of the authorization request.

Figure 1:
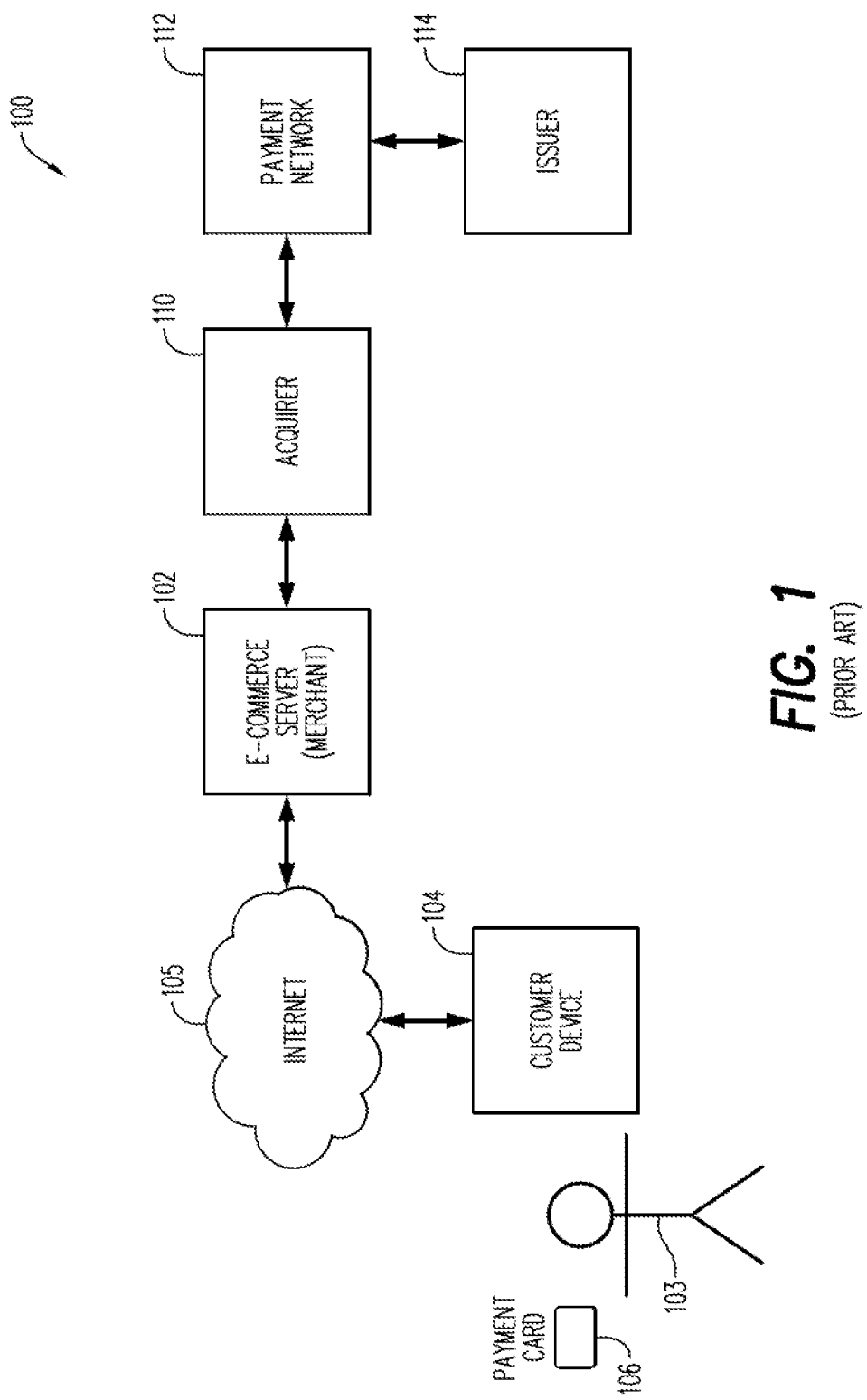
FIG. 1 is a block diagram that illustrates a conventional system that handles online purchase transactions.
Figure 2:
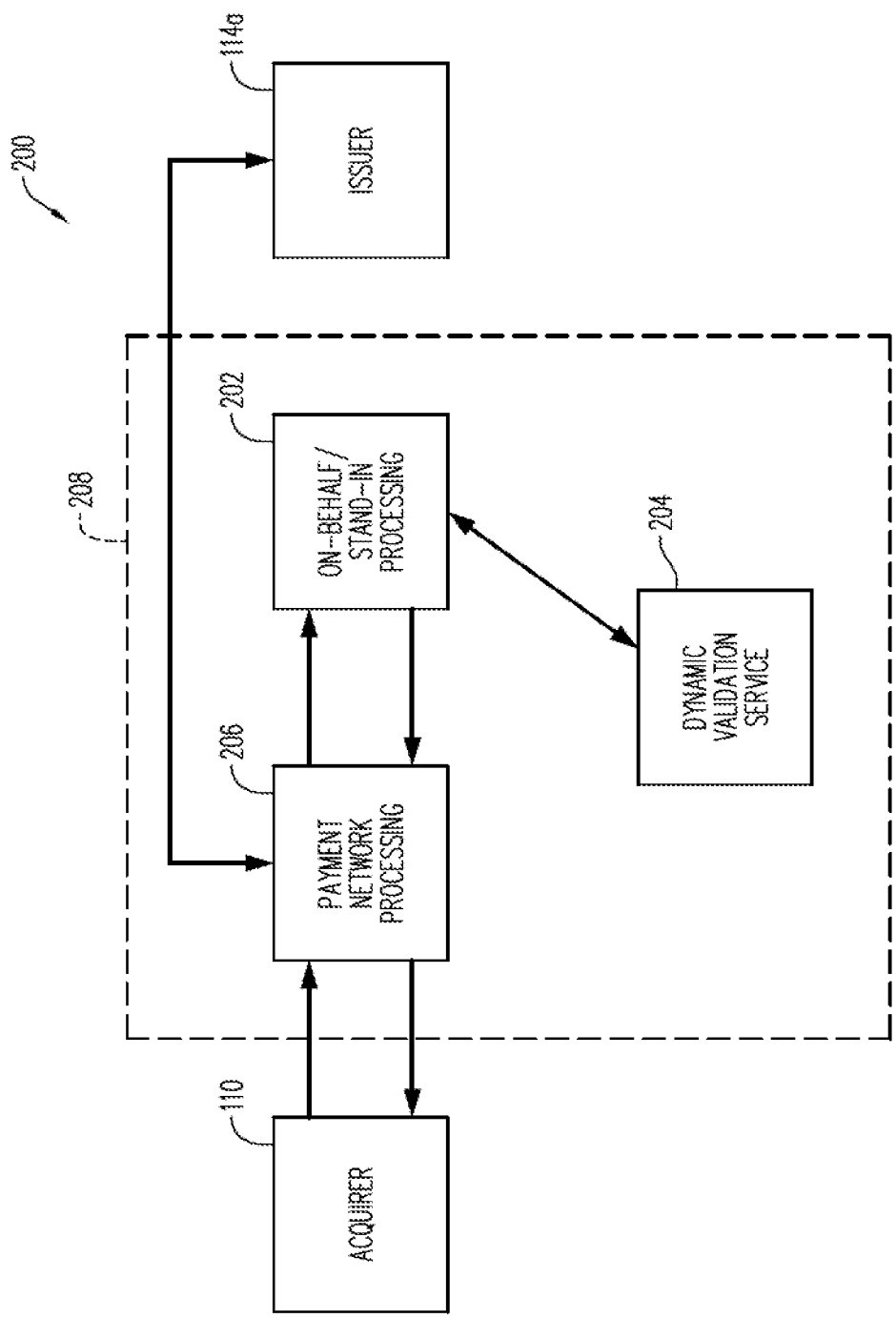
FIG. 2 is a block diagram of salient portions of a payment system according to some embodiments.

FIG. 2 is a block diagram of salient portions of a payment system 200 provided according to some embodiments. The representation of the payment system 200 as shown in FIG. 2 assumes in addition that other aspects of the payment system (that were seen in FIG. 1) are also present but not shown in FIG. 2. For example, the representation in FIG. 2 assumes that a merchant e-commerce server 102 (FIG. 1) has generated and sent to the transaction acquirer 110 (FIG. 2 and FIG. 1) an authorization request that corresponds to an online purchase transaction performed via the e-commerce website hosted by the e-commerce server. It will further be appreciated that, in such a circumstance, a customer 103 (FIG. 1) performed the online purchase transaction using a customer device 104 (FIG. 1) that accessed the e-commerce server and the merchant's website via the internet 105 (FIG. 1). It will further be assumed, for present purposes, that the customer visually referred to a payment card 106 (FIG. 1); a further assumption is that the payment card was of a commercially available type that is an IC (integrated circuit) card that generates and displays a time-varying dynamic security code. A further assumption is that the currently displayed value of the dynamic security code was read by the customer, entered by the customer as part of the payment information solicited by the e-commerce website, and included in the authorization request message generated by the e-commerce server and transmitted to the acquirer 110. A further assumption may be that the authorization request message is in a standard format for such messages and includes a PAN (primary account number) that identifies the payment account designated by the customer for use in the current purchase transaction.

In addition to the acquirer 110, the payment system 200 as shown in FIG. 2 includes a proxy computer 202 that performs on-behalf and/or stand-in processes—i.e., functions that might otherwise need to be performed by the account issuers. The payment system 200 further includes a dynamic validation service module 204 and a payment network processing computer 206. Dotted line box 208, which encompasses the proxy computer 202, the dynamic validation service module 204 and the payment network processing computer 206, is intended to imply that all three of the latter system components may be operated by the operator of a payment network, the main functions of which may be implemented by the payment network processing computer 206. Thus the payment network processing computer 206 may be seen as a modified analog of the payment network 112 referred to above in connection with FIG. 1.

Further details of the functionality provided by the proxy computer 202, the dynamic validation service module 204 and the payment network processing computer 206 will be described below. In terms of a brief overview, the payment network processing computer 206 may receive authorization requests from acquirers (such as the acquirer 110 shown in FIG. 2). The payment network processing computer 206 may forward the authorization requests to the proxy computer 202, which may detect authorization requests that contain dynamic security codes, and forward those codes for validation by the dynamic validation service module 204. The dynamic validation service module 204 may perform a verification process with respect to the dynamic security codes and provide the results of the verification process to the proxy computer 202. The proxy computer 202 may append the verification process results to the authorization requests and transmit them to the payment network processing computer 206, which may route the authorization requests to account issuers, such as the issuer 114a shown in FIG. 2 (block 114a should also be understood to represent a computer operated by or for the issuer). Authorization responses from the issuers may be routed back to the acquirers via the payment network processing computer 206.

As was the case in the payment system depiction of FIG. 1, the system components shown in FIG. 2 are only those that may be required to handle a single transaction. For example, there may be a considerable number of transaction acquirers and account issuers in a practical embodiment of the payment system 200. The payment system 200, in a practical embodiment, may handle numerous transactions, including simultaneous transactions. Moreover, one or more components of the payment system 200 may handle in-store purchase transactions and/or other types of transactions in addition to online purchase transactions.

In some embodiments, any two or more of the proxy computer 202, the dynamic validation service module 204, and/or the payment network processing computer 206 may be constituted by components of an interrelated and/or integrated computer system and/or may be housed together in a single data center.

Figure 3:
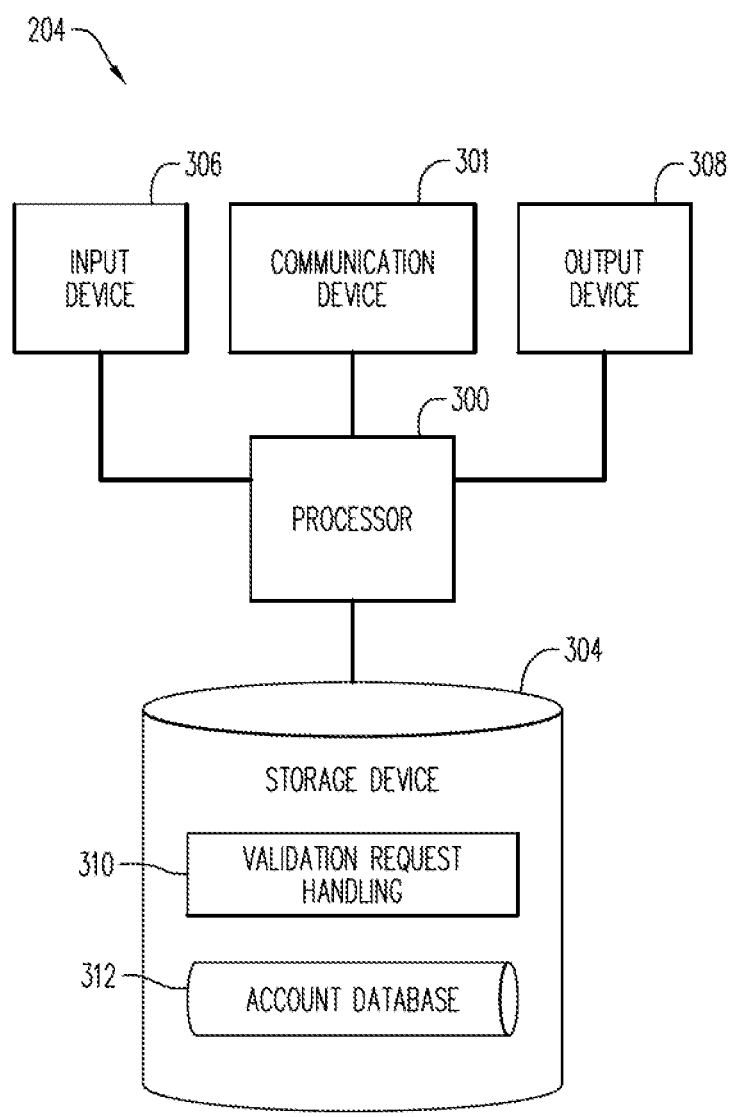
FIGS. 3 and 4 are block diagram representations of computers that may serve as components of the system shown in FIG. 2.

FIG. 3 is a block diagram representation of an embodiment of the dynamic validation service module 204.

In some embodiments, the dynamic validation service module 204 may be implemented using a software and/or hardware module solution that is commercially available from a supplier of the above-mentioned IC payment cards with dynamic security code features. In some embodiments, the dynamic validation service module 204 may be embodied in a hardware security module (HSM). In some embodiments the dynamic validation service module 204 may be constituted at least in part by typical server computer hardware, but may be controlled by software to cause it to function as described herein. Suitable security measures may be applied to the dynamic validation service module 204.

The dynamic validation service module 204 may include a processor 300 operatively coupled to a communication device 301, a storage device 304, an input device 306 and an output device 308. The communication device 301, the storage device 304, the input device 306 and the output device 308 may all be in communication with the processor 300.

The processor 300 may be constituted by one or more processors. The processor 300 may operate to execute processor-executable steps, contained in program instructions described below, so as to control the dynamic validation service module 204 to provide desired functionality.

Communication device 301 may be used to facilitate communication with, for example, other devices (such as the proxy computer 202 and the payment network processing computer 206). For example, communication device 301 may comprise numerous communication ports (not separately shown), to allow the dynamic validation service module 204 to receive and process numerous simultaneous dynamic security code validation requests.

Input device 306 may comprise one or more of any type of peripheral device typically used to input data into a computer. For example, the input device 306 may include a keyboard and a mouse. Output device 308 may comprise, for example, a display and/or a printer. (In some embodiments, input/output functions relative to the dynamic validation service module 204 may be handled via an associated computer such as the proxy computer 202.)

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the dynamic validation service module 204, executed by the processor 300 to cause the dynamic validation service module 204 to function as described herein.

The programs may include one or more conventional operating systems (not shown) or kernels that control the processor 300 so as to manage and coordinate activities and sharing of resources in the dynamic validation service module 204, and to serve as a host for application programs (described below) that run on the dynamic validation service module 204.

The programs stored in the storage device 304 may also include a validation request handling program 310 that controls the processor 300 to enable the dynamic validation service module 204 to handle and process dynamic security code validation requests.

The storage device 304 may also store, and the dynamic validation service module 204 may also execute, other programs, which are not shown. For example, such programs may include a reporting application, which may respond to requests from system administrators for reports on the activities performed by the dynamic validation service module 204. The other programs may also include, e.g., device drivers, database management programs, etc.

The storage device 304 may also store an account database 312 that is referenced by the validation request handling program 310 in connection with performing a verification process with respect to dynamic security codes received by the dynamic validation service module 204 from the proxy computer 202.

Figure 4:
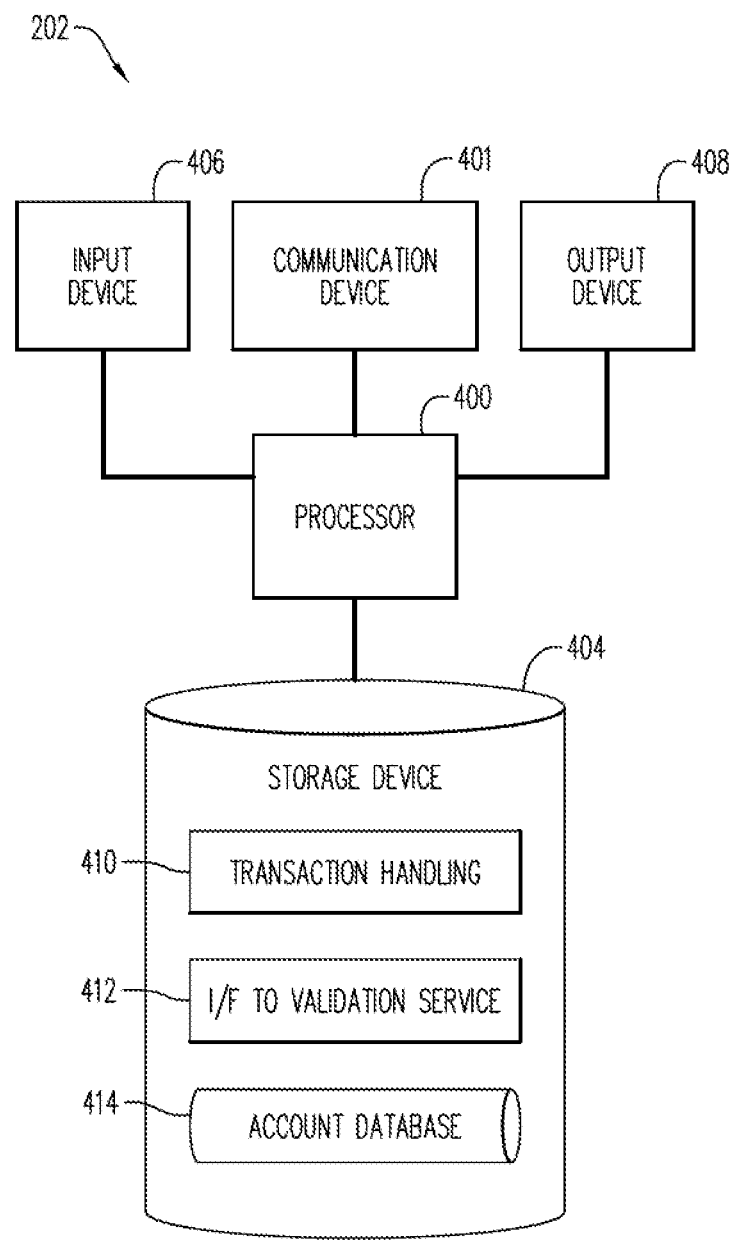

FIG. 4 is a block diagram of an embodiment of the proxy computer 202.

In its hardware architecture and components, the proxy computer 202 may, for example, resemble the hardware architecture and components described above in connection with FIG. 3. However, the proxy computer 202 may be programmed differently from the dynamic validation service module 204 so as to provide different functionality.

Returning again to the hardware aspects of the proxy computer 202, it may include a processor 400, a communication device 401, a storage device 404, an input device 406 and an output device 408. The communication device 401, the storage device 404, the input device 406 and the output device 408 may all be in communication with the processor 400.

The above descriptions of the hardware components shown in FIG. 3 may, in some embodiments, also be applicable to the like-named components shown in FIG. 4.

Storage device 404 stores one or more programs for controlling processor 400. The programs comprise program instructions (which may be referred to as computer readable program code means) that contain processor-executable process steps of the proxy computer 202, executed by the processor 400 to cause the proxy computer 202 to function as described herein.

The programs may include one or more conventional operating systems (not shown) that control the processor 400 so as to manage and coordinate activities and sharing of resources in the proxy computer 202, and to serve as a host for application programs (described below) that run on the proxy computer 202.

The storage device 404 may store a transaction handling program 410 that handles receipt, processing and transmission of messages related to payment account transactions. The transaction handling program 410 may implement functionality of the proxy computer 202 as described herein and in accordance with some embodiments.

The storage device 404 may also store software 412 that serves as an interface between the proxy computer 202 and the dynamic validation service module 204.

The storage device 404 may also store, and the proxy computer 202 may also execute, other programs, which are not shown. For example, such programs may include a reporting application, which may respond to requests from system administrators for reports on the activities performed by the proxy computer 202. The other programs may also include, e.g., device drivers, database management programs, etc.

The storage device 404 may also store one or more databases (reference numeral 414) required for operation of the proxy computer 202.

The payment network processing computer 206 may have the same type of hardware architecture and/or components as the computing device described above in connection with FIG. 3. In addition, the payment network processing computer 206 may be programmed to perform conventional functions of a payment network as well as additional functions in accordance with aspects of the present disclosure and as described herein.

The issuer computer 114a may also have the same type of hardware architecture and/or components as described above in connection with FIG. 3, and may be programmed to provide functionality as described herein.

Figure 5:
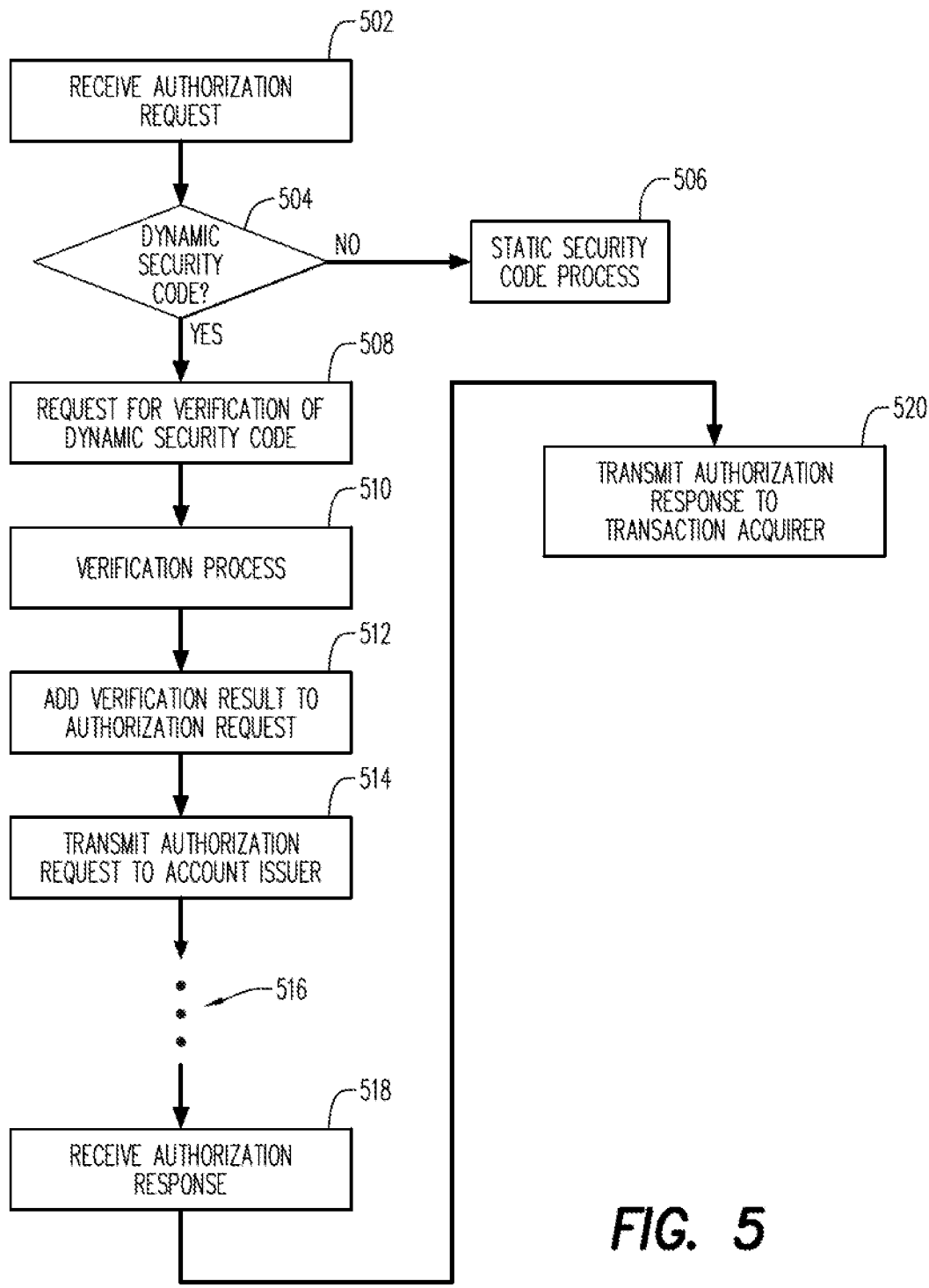
FIG. 5 is a flow chart that illustrates aspects of the present disclosure.

FIG. 5 is a flow chart that illustrates aspects of the present disclosure, including operations performed individually and/or cooperatively by the proxy computer 202, dynamic validation service module 204 and the payment network processing computer 206.

As indicated at 502 in FIG. 5, the payment network processing computer 206 may receive an authorization request message from an acquirer 110, and may forward the authorization request message to the proxy computer 202.

The processing by the proxy computer 202 may include a decision block 504. At the decision block 504, the proxy computer 202 may determine whether the authorization request received at 502 contains a dynamic security code. In some embodiments, for example, the proxy computer 202 may make this determination based on the PAN included in the authorization request. (It will be recalled that the PAN identifies the payment account designated by the customer for use in the transaction represented by the authorization request.) In particular, the proxy computer 202 may determine whether the PAN falls within one or more ranges of account numbers that have been indicated by the respective account issuers as being associated with payment accounts for which dynamic security code features were implemented (i.e., accounts for which the issued payment cards embody a dynamic security code feature). The determination may be made, for example, with reference to one or more of the databases 414 depicted in FIG. 4. If a negative determination is made at 504 (i.e., if it is determined that the authorization request does not include a dynamic security code), then block 506 may follow decision block 504 in the process of FIG. 5. Block 506 represents handling and processing the authorization request on the assumption that it contains a static rather than dynamic security code. This may result in the authorization request being handled and processed in a conventional manner.

Considering decision block 504 again, if a positive determination is made at that decision block (i.e., if the authorization request is determined to include a dynamic security code), then the process of FIG. 5 may advance from decision block 504 to block 508.

At block 508, the proxy computer 202 many generate and transmit a request for verification of the dynamic security code. The request may be transmitted from the proxy computer 202 to the dynamic validation service module 204 and may be received by the dynamic validation service module 204. The request may include, for example, the dynamic security code value to be verified and the PAN that was included in the authorization request received at 502.

Following block 508 is block 510. Block 510 includes a dynamic security code verification process, which may be performed by the dynamic validation service module 204. In some embodiments, the verification process may involve duplicating the process performed in the payment card to generate the dynamic security code and comparing the result of the code generation process performed by the dynamic validation service module 204 with the received dynamic security code value to confirm that the two match. The verification process may be a cryptographic process and may involve use of one or more cryptographic keys. In some embodiments, the required inputs to the code generation process performed by the dynamic validation service module 204 may be available in the account database 312 depicted in FIG. 3, and may be indexed by the PAN for the relevant payment account. The required inputs may include one or more cryptographic keys that may be stored in the entry for the relevant account in the account database 312. The notional match for the received dynamic security code, with the former having been generated in the dynamic validation service module 204, may be referred to as a "parallel-generated dynamic security code", given that the generation process in the dynamic validation service module 204 is parallel to the code generation process performed in the payment card.

In some embodiments, the account issuer may select the time-frame and/or circumstances under which the payment cards generate new values of the dynamic security code. For example, in some embodiments, the payment cards for a given account issuer (or class of accounts) may generate a new code value every hour, or at some other regular interval. The corresponding data entry in the account database 312 may point to data that identifies the code regeneration pattern for the payment card in question and/or may point to a suitable algorithm/process to duplicate the card-based code generation. In some embodiments, to deal with issues of time drift, latency in receiving the authorization and/or validation requests, etc., the dynamic validation service module 204 may compare current, immediately preceding, and/or immediately succeeding parallel-generated code values with the dynamic security code as received in the verification request received at 508. It will be understood that the immediately preceding parallel-generated code value may be adjacent the current parallel-generated code value in a sequence of parallel-generated code values for the relevant payment account, and similarly the current parallel-generated code value may be adjacent the succeeding parallel-generated code value in the sequence of parallel-generated code values for the relevant payment account.

In some embodiments, the software and/or hardware required to parallel-generate the dynamic security code in the dynamic validation service module 204 may be commercially available from, and may be obtained from, the supplier of the card blanks that incorporate the dynamic security code features, and which correspond to the payment account in question or the corresponding group of payment cards.

A number of different dynamic security code generation and verification algorithms may be commercially available for use in connection with the payment system 200.

The verification process may have a number of different outcomes, such as "successful", "invalid", "timed out", or "inconclusive". The last may occur, for example, if the PAN submitted with the verification request is not found in the account database 312. The dynamic validation service module 204 may pass the result of the verification process to the proxy computer 202.

Block 512 may follow block 510 in the process of FIG. 5. The process of block 512 may be performed by the proxy computer 202. At 512, the proxy computer 202 may add the result of the verification process (or an indicator therefor, which may also be considered the result) to the authorization request for the transaction for which dynamic security code verification was requested at 508. Then, at 514, the proxy computer 202 may transmit the authorization request to the payment network processing computer 206, which may route the authorization request—including the verification result—to the issuer 114*a* (FIG. 2). In some embodiments, the authorization request, as transmitted by the payment network processing computer 206 to the issuer, may also include a static security code that the issuer had previously assigned of record to the payment account in question. The proxy computer 202 may have inserted the static security code into the authorization request before transmitting it to the issuer. In some embodiments, the authorization request, as transmitted by the payment network processing computer 206 to the issuer, may not include the dynamic security code value that was contained in the authorization request when it was received at 502. In some embodiments, the authorization request, as transmitted by the payment network processing computer 206 to the issuer, may include an indication that a dynamic security code verification has been performed with respect to the authorization request.

In some embodiments, the process of FIG. 5 may have a lapse of time (represented at 516) after block 514 while the issuer processes the authorization request. In some embodiments, the lapse of time may typically be rather brief. Thereafter, the payment network processing computer 206 may receive the authorization response from the issuer 114*a*, as indicated by block 518. Then—as indicated at block 520—the payment network processing computer 206 may route the authorization request to the acquirer 110 (FIG. 2). In some embodiments, it may be necessary or desirable for the dynamic verification results to be stripped from the authorization response before it is sent to the acquirer. If so, this may be done at the proxy computer 202 or the payment network processing computer 206.

One implication of the foregoing is that the issuer 114*a* may receive (from the payment network processing computer 206) an authorization request that is different from a conventional authorization request. The difference may lie in that, in accordance with the present disclosure, the authorization request may include a result of a dynamic security code verification process (the "verification result"). Accordingly, the issuer computer 114a may be programmed to consider the verification result in determining whether or not to approve the authorization request. It may well be the case that a "successful" verification result will increase the likelihood that the issuer 114a will approve the authorization request, and that an "invalid" verification result will decrease the likelihood that the issuer will approve the authorization request. For example, the issuer computer 114a may be programmed to approve high value transactions only if the verification result is "successful". In another example, the issuer computer 114a may be programmed to approve low value transactions (assuming the account is in good standing, etc.) even if the verification result is "invalid" or "inconclusive". It may be up to the issuer to decide how it will act in various kinds of situations on the basis of the various possible verification results.

In some embodiments, the proxy computer 202 may perform so-called "stand-in" services, in which the proxy computer 202 may decide to approve or decline the transaction—based on one or more rules pre-determined by the account issuer—in cases where no authorization response is received from the issuer. In some embodiments, the rule(s) may provide that the proxy computer 202 is to make the decision on the transaction based at least in part on the dynamic security code verification result generated with respect to the corresponding authorization request.

With a dynamic security code verification service as described herein, an account issuer's adoption of dynamic security code payment cards may be highly streamlined, since little change in infrastructure may be required for the issuer apart from a modest amount of programming of its computer that handles authorization requests. With this service, the issuer is immediately compatible with all online merchants and does not need to install platform-specific hardware or software. At the same time, the issuer may benefit by the improved protections against fraudulent transactions supported by use of dynamic security codes.

By the same token, merchants may not need to change their systems at all, or only to a limited extent, and may also benefit from reduced risk of fraudulent transactions. For cardholders also, little in the way of adaptation may be required, and enhanced security may be provided.

In embodiments described above, the proxy computer 202 may detect that an incoming authorization request includes a dynamic security code by comparing a PAN included in the authorization request with relevant ranges of account numbers. However, in alternative embodiments, one or more other processes may be employed to detect that the incoming authorization request includes a dynamic security code. For example, in some embodiments, the incoming authorization request may carry an indicator that shows that the security code contained within the authorization request is dynamic, and the proxy computer 202 may read the indicator.

In some embodiments, card-on-file transactions submitted by merchants may include a previously verified dynamic security code, and in such cases, and in some embodiments, the system 200 would not re-verify the dynamic security code.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable, including simultaneous performance of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A payment network computer comprising:
   a communication device configured to receive, from an integrated circuit (IC) payment card via a computer network, a transaction authorization request message comprising a primary account number (PAN) identifying a customer payment account and a security code; and
   a processor operably connected to the communication device and to a storage device, wherein the storage device includes processor executable instructions which when executed cause the processor to:
   determine that the security code is a dynamic security code based on a predefined range of payment accounts numbers (PANs) stored in a database, wherein the predefined range of PANs is associated with payment accounts for which dynamic security code features were implemented;
   verify that the security code is valid by:
   identifying a data entry in an account database based on the PAN, wherein the data entry points to one of a code regeneration pattern for the IC payment
card or a process for duplicating the security code;
re-creating a copy of the dynamic security code
based on predefined logic by using one of the code
regeneration pattern or the process for duplicating
the security code; and
determining that the re-created copy of the dynamic
security code matches the security code received
from the IC payment card;
modify, via the payment network processing computer,
the transaction authorization request message to
include a verification indicator in a field thereof
which indicates that dynamic security code verification has been performed and that the security code is
verified as valid; and
transmit the modified transaction authorization request
message to an issuer system of the payment account
via the payment network.

2. The payment network computer of claim 1, wherein, following the determination that the security code is the dynamic security code, the processor is further configured to verify the dynamic security code based on a previous dynamic security code assigned to the payment account.

3. The payment network computer of claim 1, wherein, following the determination that the security code is the dynamic security code, the processor is further configured to verify the dynamic security code based on a succeeding dynamic security code that is yet to be assigned to the payment account.

4. The payment network computer of claim 1, wherein, following the determination that the security code is the dynamic security code, the processor is further configured to add a static security code that the issuer system previously assigned to the payment account to the transaction authorization request message prior to transmission of the modified transaction authorization request message to the issuer system.

5. The payment network computer of claim 1, wherein the processor is configured to determine whether or not to approve or decline the transaction authorization request message when no response is received from the issuer system and transmit the determination to a computing system that sent the transmission authorization request message.

6. A method comprising:
receiving, by a processor of a payment network processing computer from an integrated circuit (IC) payment card via a computer network, a transaction authorization request message comprising a primary account number (PAN) identifying a customer payment account and a security code;
determining, by the processor, that the security code is a dynamic security code based on a predefined range of payment accounts numbers (PANs) stored in a database, wherein the predefined range of PANs is associated with payment accounts for which dynamic security code features were implemented;
verifying, by the processor, that the security code is valid by:
identifying a data entry in an account database based on the PAN, wherein the data entry points to one of a code regeneration pattern for the IC payment card or a process for duplicating the security code;
re-creating a copy of the dynamic security code based on predefined logic by using one of the code regeneration pattern or the process for duplicating the security code; and
determining that the re-created copy of the dynamic security code matches the security code received from the IC payment card;
modifying, by the processor, the transaction authorization request message to include a verification indicator in a field thereof which indicates that dynamic security code verification has been performed and that the security code is verified as valid; and
transmitting, by the processor, the modified transaction authorization request message to an issuer system of the payment account via the payment network.

7. The method of claim 6, wherein determining that the security code is the dynamic security code is further based on an additional indicator that is included in the transaction authorization request message.

8. The method of claim 6, wherein, following the determination that the security code is the dynamic security code, verifying the dynamic security code is further based on a previous dynamic security code assigned to the payment account.

9. The method of claim 6, wherein, following the determination that the security code is the dynamic security code, verifying the dynamic security code is further based on a succeeding dynamic security code that is yet to be assigned to the payment account.

10. The method of claim 6, wherein, following the determination that the security code is the dynamic security code, the modifying comprises adding a static security code that the issuer system previously assigned to the payment account to the transaction authorization request message prior to transmission of the modified transaction authorization request message to the issuer system.

11. The method of claim 6, wherein the method further comprises determining whether or not to approve or decline the transaction authorization request message when no response is received from the issuer system and transmitting the determination to a computing system that sent the transmission authorization request message.

12. A non-transitory computer-readable medium comprising instructions which when executed by a processor cause a computer to perform a method comprising:
receiving, from an integrated circuit (IC) payment card via a computer network, a transaction authorization request message comprising a primary account number (PAN) identifying a customer payment account and a security code;
determining that the security code is a dynamic security code based on a predefined range of payment accounts numbers (PANs) stored in a database, wherein the predefined range of PANs is associated with payment accounts for which dynamic security code features were implemented;
verifying that the security code is valid by:
identifying a data entry in an account database based on the PAN, wherein the data entry points to one of a code regeneration pattern for the IC payment card or a process for duplicating the security code;
re-creating a copy of the dynamic security code based on predefined logic by using one of the code regeneration pattern or the process for duplicating the security code; and
determining that the re-created copy of the dynamic security code matches the security code received from the IC payment card;
modifying the transaction authorization request message to include a verification indicator in a field thereof which indicates that dynamic security code verification has been performed and that the security code is verified as valid; and transmitting the modified transaction authorization request message to an issuer system of the payment account via the payment network.

13. The non-transitory computer-readable medium of claim 12, wherein verifying the dynamic security code is further based on a dynamic security code previously assigned to the payment account and a succeeding dynamic security code that is yet to be assigned to the payment account.

* * * * *